United States Patent [19]

Stewart

[11] Patent Number: 5,184,670
[45] Date of Patent: Feb. 9, 1993

[54] HEAT EXCHANGER

[75] Inventor: Peter J. Stewart, Maddington, Australia

[73] Assignee: Seaford Nominees Pty. Ltd., Australia

[21] Appl. No.: 776,364

[22] PCT Filed: Apr. 3, 1991

[86] PCT No.: PCT/AU91/00124
§ 371 Date: Nov. 22, 1991
§ 102(e) Date: Nov. 22, 1991

[87] PCT Pub. No.: WO91/15726
PCT Pub. Date: Oct. 17, 1991

[30] Foreign Application Priority Data

Apr. 3, 1990 [AU] Australia ................... PJ453

[51] Int. Cl.$^5$ ............................ F28F 7/00; F26B 17/12
[52] U.S. Cl. .................................. 165/82; 165/920; 34/176
[58] Field of Search ............ 165/82, 920; 34/51, 34/64, 176

[56] References Cited

U.S. PATENT DOCUMENTS

| | | | |
|---|---|---|---|
| 685,336 | 10/1901 | Leroy et al. | 432/102 |
| 971,479 | 9/1910 | Wegner | 34/176 |
| 1,174,371 | 3/1916 | Wegner | 34/176 |
| 1,704,093 | 3/1929 | Frederick | 202/114 |
| 1,704,094 | 3/1929 | Frederick | 202/85 |
| 1,899,397 | 2/1933 | Reiche | 165/920 |
| 2,926,428 | 3/1960 | Adam et al. | 34/176 |
| 2,932,904 | 4/1960 | Morehouse | 34/175 |
| 3,263,747 | 8/1966 | McKay | 165/82 |
| 4,285,396 | 8/1981 | Schwoerer et al. | 165/82 |
| 4,353,726 | 10/1982 | Rough, Sr. | 165/920 |
| 4,360,057 | 11/1982 | Koump | 165/82 |
| 4,784,216 | 11/1988 | Bracegirdle et al. | 165/920 |
| 4,947,929 | 8/1990 | Stewart | 165/920 |

FOREIGN PATENT DOCUMENTS

| | | |
|---|---|---|
| 554940 | 9/1986 | Australia . |
| 574012 | 10/1987 | Australia . |
| 3309600 | 11/1983 | Fed. Rep. of Germany ........ 165/82 |
| 88/02090 | 3/1988 | World Int. Prop. O. . |

Primary Examiner—John Rivell
Assistant Examiner—L. R. Leo
Attorney, Agent, or Firm—Merchant, Gould, Smith, Edell, Welter & Schmidt

[57] ABSTRACT

A heat exchanger for heating fluid particulate material comprising a heating chamber (11), heating means associated with the heating chamber (11), a receptacle (14) mounted above the heating chamber (11), a delivery chamber (17) located below the heating chamber (11), a set of flow passageways (16) extending through the heating chamber (11) between the receptacle (14) and the delivery chamber (17), the delivery chamber (17) having an outlet (18) at its lower portion wherein the delivery chamber (17) is provided with at least one restricted passageway (24) opening into the heating chamber (11) for the relief of gaseous pressure developed in the delivery chamber (17).

7 Claims, 2 Drawing Sheets

HEAT EXCHANGER

THIS INVENTION relates to a heat exchanger and in particular a heat exchanger which can be used to treat particulate material for the purpose of calcining, drying, reactivation, effecting endothermic and exothermic reactions and like heat treatments.

In one form the invention resides in a heat exchanger for heating fluid particulate material comprising a heating chamber, heating means associated with the heating chamber, a receptacle mounted above the heating chamber, a delivery chamber located below the heating chamber, a set of flow passageways extending through the heating chamber between the hopper and the delivery chamber said delivery chamber having an outlet at its lower portion wherein the delivery chamber is provided with at least one restricted passageway opening into the heating chamber for the relief of gaseous pressure developed in the delivery chamber.

According to a preferred feature of the invention the passageway is adapted to increase the degree of opening between the delivery chamber and heating chamber with an increase in temperature.

According to a preferred feature of the invention said delivery chamber and heating chamber are separated by a wall and said passageway is formed by a hope through said wall.

According to a preferred feature of the previous feature said hole is located substantially centrally.

According to a preferred feature of each of the previous two features the aperture is associated with a plurality of kerfs extending radially from said aperture The invention will be more fully understood in the light of the following description of one specific embodiment. The description is made with reference to the accompanying drawings of which;

Figure 1:
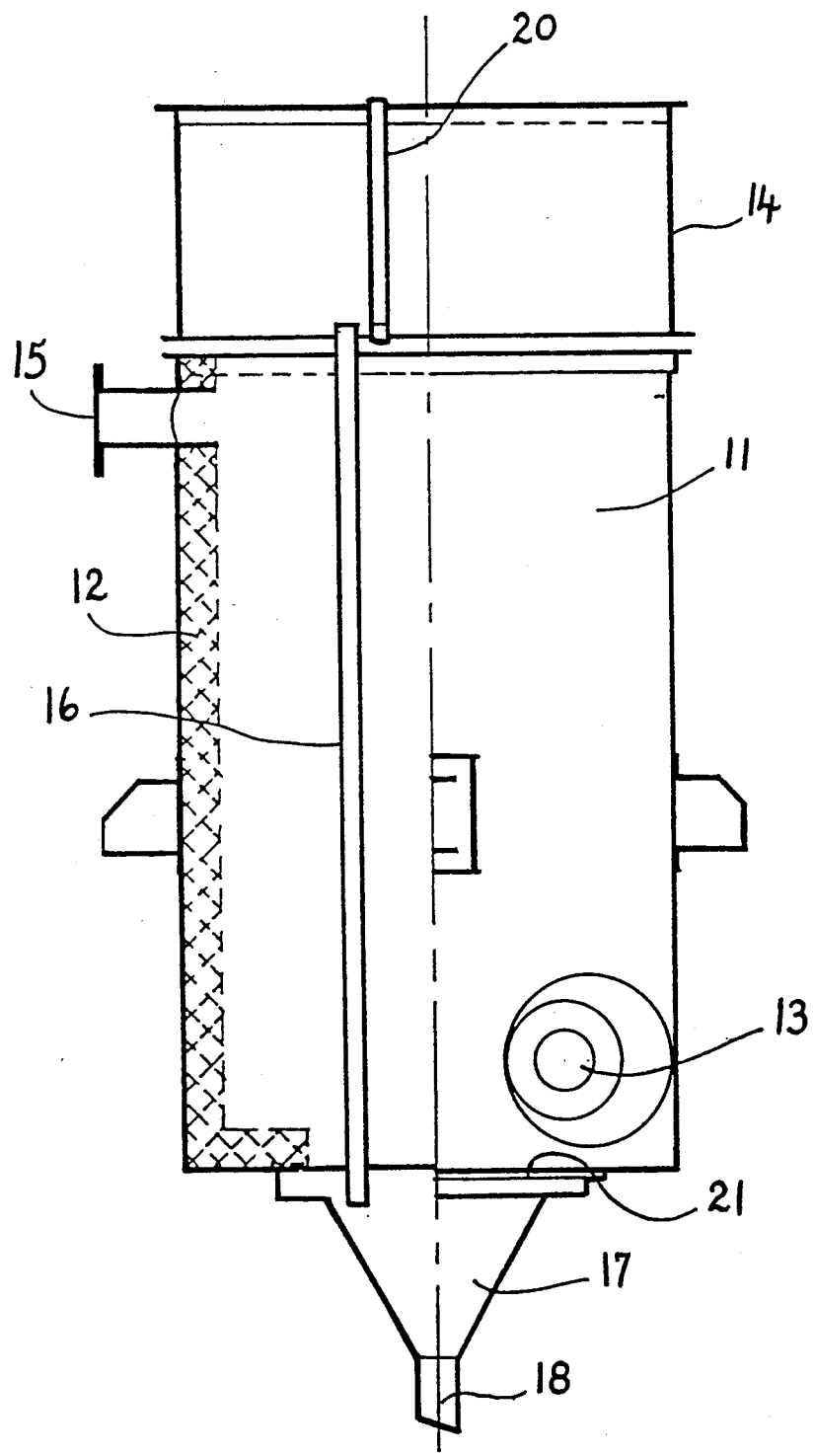
FIG. 1 is a part sectional elevation of a heat exchanger according to the embodiment.

The embodiment is directed to a heat exchanger for the heating of particulate material for the drying and/or reactivation of such particulate material. The general form of the heat exchanger to which the embodiment relates is the subject of Australian Patent No. 574012.

It has been found in the past in using the heat exchanger described above in the drying of carbon pulp for the purpose of drying and/or reactivation of the pulp that where particulate material carries with it organic contaminant materials that a significant back pressure can be developed in the delivery chamber as a result of the pyrolysis of such organic contaminants on passage of the particulate material through the heat exchanger. It is an object of this embodiment to provide a means of venting such gaseous pressure and disposing of the gases to reduce the possibility of the escape of noxious gases into the atmosphere.

The embodiment comprises a heat exchanger having a substantially cylindrical closed heating chamber 11 accommodating a burner (not shown) nozzle which is supported from a port 13 located at the lower portion of the heating chamber and which is directed substantially tangentially into the heat exchanger. The side walls of the heat exchanger are clad by insulating material 12. A flue pipe 15 is provided at the upper end of the heating chamber for the exhaustion of the combustion products. The upper end of the heating chamber 11 is associated with a receptacle which comprises a hopper 14 while the lower end of the heating chamber is associated with a delivery chamber 17.

The hopper 14 is supported to be above the upper wall of the heating chamber such that a space exists between the two. The hopper itself is provided with a plurality of air circulation tubes 20 which extend upwardly from the lower wall to above the expected level of material in the hopper. In use an air flow of heated air will be generated in the air circulation tubes from the space above the heat exchanger which serves in heating the contents of the hopper and may facilitate some preheating and/or drying of the contents.

The heat exchanger is associated with a plurality of heat exchanger tubes 16 which extend between the hopper 14 and the delivery chamber 17 such that they pass through the heating chamber. The heating tubes may be arranged in any suitable array such as a plurality of concentric circular arrays (only one is shown), a set of radial arrays, a random array or as is considered appropriate. The heat exchanger tubes of the embodiment are supported from the hopper and extend through apertures provided in the upper and lower walls of the heating chamber without being rigidly fixed to the heating chamber. Alternatively the heating tubes may be supported from the delivery chamber. The mounting of the heat exchange tube 16 is such in order to allow for thermal expansion and contraction and consequent differential movement of the heating chamber 11 hopper 14 and delivery chamber 17 during operation of the heat exchanger.

The delivery chamber is located below the heating chamber and is provided with an outlet 18 shown generally in the drawings. The delivery chamber provides a means for cooling the material flowing from the heating tubes and isolating such material from the atmosphere which is required in instances where the heated material can be reactive.

Figure 2:
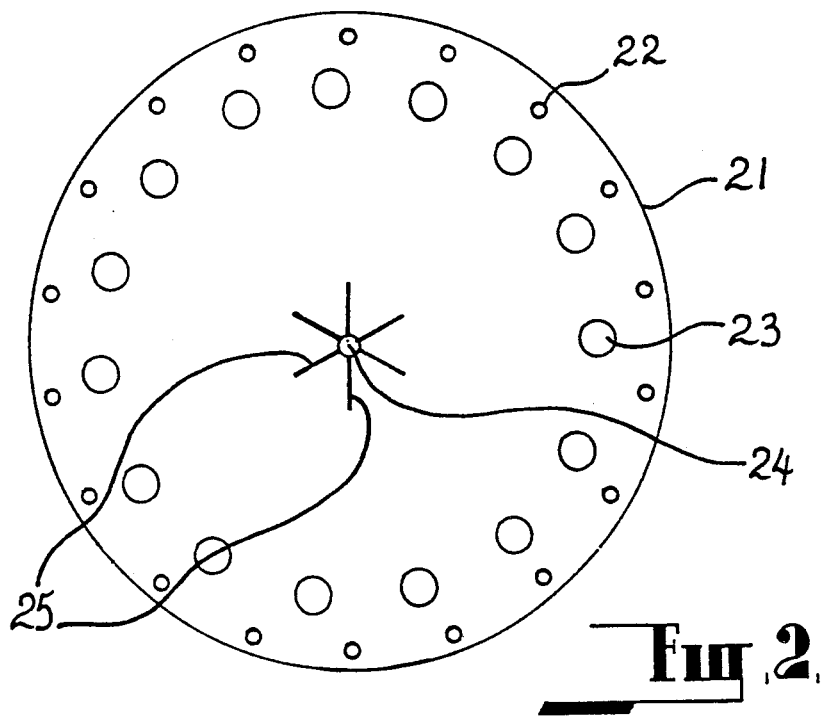
FIG. 2 is a schematic plan view of the wall of the heat exchanger separating the heating chamber from the delivery chamber.
Figure 3A:
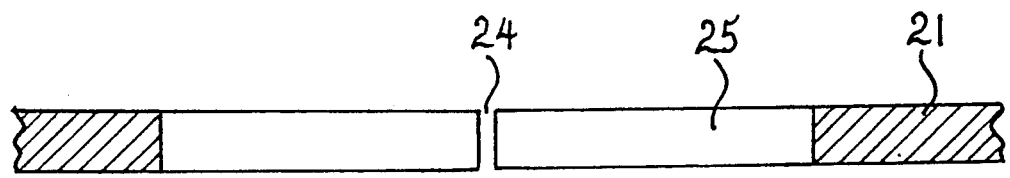
FIGS. 3a, b and c are schematic partial sectional elevations of the wall separating the heating chamber from the delivery chamber illustrating the portion of the wall incorporating that passageway at various stages of deformation.
Figure 3B:
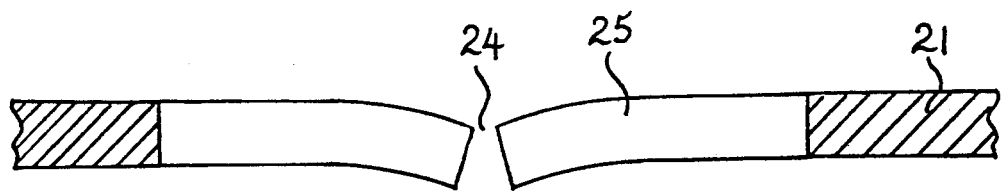
Figure 3C:
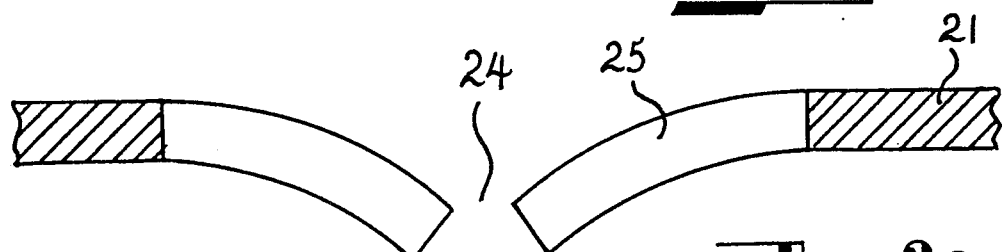

In the case of the present embodiment the delivery chamber 17 and heating chamber 11 are separated by a wall 21 and a plan view of the wall of the delivery chamber 17 is shown at FIG. 2. The wall 21 is provided around its periphery with a plurality of circumferentially spaced holes 22 for engagement with bolts provided on the lower face of the heating chamber 11. The wall also has a set of apertures 23 which are spaced radially inwardly from the set of holes 22 and which are dimensioned to snugly receive the lower end of the heat exchange tubes 16. (Only some of the apertures 23 are shown in FIG. 2). The apertures 23 are dimensioned to provide a non-interference fit with the heat exchanger tubes to allow for differential movement therebetween as a result of thermal expansion and contraction. If desired a suitable seal may be provided between each aperture and the heating tubes.

In use the material is deposited into the hopper 14 and is allowed to flow through the heating tubes 16 into the delivery chamber 17. In the passage between the hopper 14 and the delivery chamber the material is heated. The function of the heating may be for the purposes of reactivation in the case of carbon pulp and/or drying or disposing of contaminants or calcining or effecting any reaction requiring the heating of the material. On the entry of the heated material into the delivery chamber, gases may evolve from the heated material which results in the generation of a gaseous pressure in the delivery chamber which in turn can interfere with the flow of material to and from the delivery chamber.

The wall 21 subdividing the heating chamber and delivery chamber is provided with at least one aperture 24 which can be central if desired. A series of radially directed kerfs 25 which are cut through the wall or around the aperture and are of substantially the same length. In addition or alternatively at least some of the apertures 23 which accommodate the heat exchanger tubes may be formed with a set of radially directed kerfs 25 in which case a seal is not provided between the apertures and the tubes.

When the heat exchanger is in the start up phase during which the wall 21 is substantially cool, the flow path through the passageway defined by the at least an aperture 24 and/or spaces between the heat exchanger tubes and apertures 23 and the respective kerfs 25 is substantially restricted. As the wall heats however, the wall expands and as a result of such expansion the wall deforms by the central portion being deflected axially. As a result the portions defined between the kerfs 25 are deflected out of the plane of the wall such that the apertures 24 and/or apertures 23 will increase in dimensions. This deformation increases the degree of communication between the delivery chamber and the heating chamber.

In the event that the particulate material which is entering the heat exchange tubes is contaminated with organic materials gaseous products resulting from the pyrolysis of such organic materials develop a pressure whereby they are forced into the heat exchanger through the aperture 24 and/or the space between the aperture 23 and the heating tubes 16 at which time they are consumed within the heating chamber.

In the event of a heavy contamination of the particulate material by organic material the flow of gaseous pyrolysis products from the particulate material will be greater and as a result the combustion occurring in the heating chamber in the region of the aperture 24 is such that the wall is heated further to cause the portions defined between the kerfs 25 to deflect even further which further opens the aperture 24 and relieves pressure that may be created in the combustion chamber. The net effect of the gaseous flow from the delivery chamber into the heating chamber further serves to ensure that the hot particulate material flowing into the delivery chamber remains substantially isolated from the oxidizing influences of the heating chamber.

The heat exchanger of the embodiment described above has been found to be of particular advantage when required to reactivate particulate carbon which may have become contaminated with a significant quantity of organic material during use.

It should be appreciated that the scope of the present invention need not be restricted to the particular scope of the embodiment described above.

The claims defining the invention are as follows:

1. A heat exchanger for heating fluid particulate material comprising a heating chamber, heating means associated with the heating chamber, a receptacle mounted above the heating chamber, a delivery chamber located below the heating chamber, a set of flow passageways extending through the heating chamber between the receptacle and the delivery chamber, the delivery chamber having an outlet at its lower portion wherein the delivery chamber is provided with at least one restricted passageway opening into the heating chamber for the relief of gaseous pressure developed in the delivery chamber and further wherein the at least one restricted passageway is adapted to increase the degree of opening between the delivery chamber and the heating chamber with an increase in temperature.

2. A heat exchanger as claimed in claim 1, said delivery chamber and heating chamber being separated by a wall and each of said at least one restricted passageway further comprises a hole through said wall.

3. A heat exchanger as claimed in claim 2 wherein said hole is located substantially centrally.

4. A heat exchanger as claimed in claim 3 wherein said hole is associated with a plurality of kerfs extending radially from said aperture.

5. A heat exchanger as claimed in claim 1 wherein said set of flow passageways further comprises tubes extending from the receptacle to the delivery chamber, said wall having a set of apertures each of which receives one of said tubes of said set of flow passageways.

6. A heat exchanger as claimed in claim 5 wherein at least one of said tubes are received as a non-interference fit within their respective apertures and said at least one restricted passageway includes a space between said at least one tube and the respective aperture.

7. A heat exchanger as claimed at claim 6 wherein said respective aperture is formed with a plurality of kerfs extending radially from the apertures.

* * * * *

UNITED STATES PATENT AND TRADEMARK OFFICE
CERTIFICATE OF CORRECTION

PATENT NO. : 5,184,670

DATED : February 9, 1993

INVENTOR(S) : P. J. Stewart

It is certified that error appears in the above-identified patent and that said Letters Patent is hereby corrected as shown below:

Title page, item (30), Priority Data, "PJ453" should read --PJ9453--.

Column 1, line 33, after "aperture" insert a period.

Column 4, line 40 and 41, "receives" should read --receive--.

Signed and Sealed this

Fourth Day of January, 1994

Attest:

BRUCE LEHMAN

Attesting Officer

Commissioner of Patents and Trademarks